United States Patent
Lee et al.

(10) Patent No.: US 11,005,541 B2
(45) Date of Patent: May 11, 2021

(54) METHOD FOR TRANSMITTING FEEDBACK INFORMATION AND TERMINAL THEREFOR

(71) Applicant: LG ELECTRONICS INC., Seoul (KR)

(72) Inventors: Woonghee Lee, Seoul (KR); Sangrim Lee, Seoul (KR); Hojae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/765,844

(22) PCT Filed: Nov. 21, 2018

(86) PCT No.: PCT/KR2018/014357
§ 371 (c)(1),
(2) Date: May 20, 2020

(87) PCT Pub. No.: WO2019/103454
PCT Pub. Date: May 31, 2019

(65) Prior Publication Data
US 2020/0358484 A1 Nov. 12, 2020

Related U.S. Application Data

(60) Provisional application No. 62/588,928, filed on Nov. 21, 2017.

(51) Int. Cl.
*H04K 1/10* (2006.01)
*H04L 27/28* (2006.01)
(Continued)

(52) U.S. Cl.
CPC ......... *H04B 7/0417* (2013.01); *H04B 7/0634* (2013.01); *H04B 7/0639* (2013.01); *H04B 17/27* (2015.01)

(58) Field of Classification Search
CPC .... H04B 7/0417; H04B 17/27; H04B 7/0639; H04B 7/0634; H04W 24/08
(Continued)

(56) References Cited

U.S. PATENT DOCUMENTS

2019/0058560 A1* 2/2019 Chen ................ H04W 24/08

FOREIGN PATENT DOCUMENTS

| KR | 101508105 | 4/2015 |
| KR | 20150113933 | 10/2015 |
| WO | 2017/171485 | 10/2017 |

OTHER PUBLICATIONS

PCT International Application No. PCT/KR2018/014357, International Search Report dated Mar. 21, 2019, 15 pages.
(Continued)

*Primary Examiner* — Phuong Phu
(74) *Attorney, Agent, or Firm* — Lee Hong Degerman Kang Waimey

(57) ABSTRACT

A method for transmitting feedback information by a terminal may comprise the steps of: measuring a channel; multiplying a first matrix associated with the measured channel by a transformation matrix, so as to obtain a second matrix and transmitting the obtained second matrix to a base station in a bit format. In addition, the transformation matrix may be determined on the basis of an angle offset satisfying a predetermined condition.

12 Claims, 16 Drawing Sheets

(51) Int. Cl.
*H04B 7/0417* (2017.01)
*H04B 17/27* (2015.01)
*H04B 7/06* (2006.01)

(58) Field of Classification Search
USPC .................................. 375/260, 346, 219, 220
See application file for complete search history.

(56) References Cited

OTHER PUBLICATIONS

MediaTek Inc., "Codebook based transmission for UL," 3GPP TSG RAN WG1 Meeting NR#3, R1-1716785, Nagoya, Japan, Sep. 18-21, 2017, 22 pages.
Ericsson, "Codebook design for Type II CSI feedback," 3GPP TSG-RAN WG1 #89, R1-1708688, Hangzhou, China, May 15-19, 2017, 12 pages.

* cited by examiner

METHOD FOR TRANSMITTING FEEDBACK INFORMATION AND TERMINAL THEREFOR

CROSS-REFERENCE TO RELATED APPLICATIONS

This application is the National Stage filing under 35 U.S.C. 371 of International Application No. PCT/KR2018/014357, filed on Nov. 21, 2018, which claims the benefit of U.S. Provisional Application No. 62/588,928, filed on Nov. 21, 2017, the contents of which are all hereby incorporated by reference herein in their entirety.

TECHNICAL FIELD

The present disclosure relates to wireless communication, and more particularly, to a method of transmitting feedback information and a user equipment (UE) therefor.

BACKGROUND ART

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications.

Communication system design considering services/UEs sensitive to reliability and latency is also under discussion. As such, introduction of new radio access technology considering enhanced mobile broadband communication (eMBB), massive MTC, and ultra-Reliable and low latency communication (URLLC) is being discussed. In the present disclosure, for simplicity, this technology will be referred to as New RAT.

In legacy LTE, a user equipment (UE) implicitly transmits a channel state information (CSI) feedback (e.g., a channel quality indicator (CQI) or a precoding matrix index (PMI)), and operates in closed-loop multiple input multiple output (MIMO) mode based on the CSI feedback. However, an increase in the number of antennas at a gNB and a UE is under consideration in NR. To achieve a higher multi-user MIMO (MU-MIMO) gain, an explicit feedback (e.g., pure channel, a channel covariance matrix, or an eigenvalue/eigenvector) transmission method as well as an implicit feedback method may be considered for the UE. However, because explicit feedback increases feedback overhead, there is a need for transmitting accurate feedback information with a minimized number of feedback bits.

DISCLOSURE

Technical Problem

Provided is a method of reducing multiple input multiple output (MIMO) feedback overhead by a user equipment (UE).

Provided is also a UE that performs a method of reducing MIMO feedback overhead.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting feedback information by a user equipment (UE) includes measuring channels, obtaining a second matrix by multiplying a first matrix related to the measured channels by a transform matrix, and transmitting the obtained second matrix in bits to a base station (BS). The transform matrix may be determined based on an angle offset satisfying a predetermined condition.

When orthogonality of direct of arrival (DoA) and angle of arrival (AoA) of the first matrix is maintained, the predetermined condition may be satisfied, and the angle offset may include an angle offset for the DoA and an angle offset for the AoA.

The angle offset may be determined based on an index minimizing a cost function for the second matrix.

The cost function may be a function of calculating the sum of absolute values of elements of the second matrix.

The angle offset may be determined within a predetermined range, and information about the predetermined range may be received from the BS by higher-layer signaling.

The angle offset may be determined by searching all elements of the predetermined range.

Information about the angle offset for the DoA and the angle offset for the AoA included in the angle offset may be transmitted to the BS.

Advantageous Effects

A method of transmitting feedback information by a user equipment (UE) according to an aspect of the present disclosure may reduce an error caused by non-orthogonality of the direction of arrival (DoA) and angle of arrival (AoA) of measured channels by applying an angle offset to a transform matrix multiplied by a matrix of the measured channels.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Figure 1:
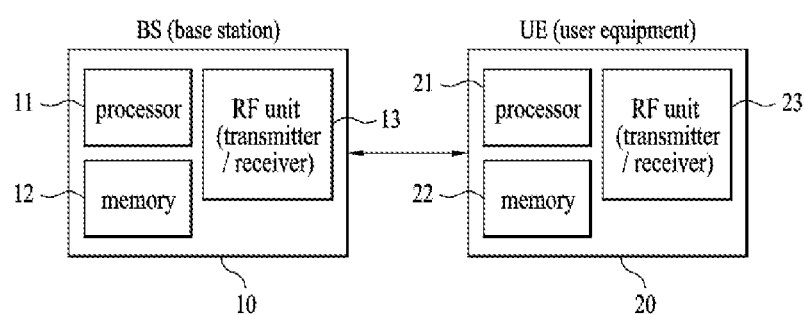
FIG. 1 is a diagram illustrating an exemplary system for implementing the present disclosure.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a system for implementing the present disclosure.

Referring to FIG. 1, a wireless communication system includes a BS 10 and one or more UEs 20. On downlink (DL), a transmitter may be a part of the BS 10 and a receiver may be a part of the UE 20. On uplink (UL), the BS 10 may include a processor 11, a memory 12, and a radio frequency (RF) unit 13 (transmitter and receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive radio signals. The UE 20 may include a processor 21, a memory 22, and an RF unit 23 (transmitter and receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive radio signals. The BS 10 and/or the UE 20 may include a single antenna and multiple antennas. If at least one of the BS 10 or the UE 20 includes multiple antennas, the wireless communication system may be called a multiple input multiple output (MIMO) system.

In the present specification, although the processor 21 of the UE and the processor 11 of the BS perform an operation of processing signals and data, except for a function of receiving or transmitting signals and a function of storing signals, the processors 11 and 21 will not be especially mentioned for convenience of description. Even though the processors 11 and 21 are not particularly mentioned, it may be said that the processors 11 and 21 perform operations of processing data except for a function of receiving or transmitting signals.

The present disclosure proposes various new frame structure for a $5^{th}$ generation (5G) communication system. In the next generation 5G system, communication scenarios are classified into Enhanced Mobile Broadband (eMBB), Ultra-reliability and low-latency communication (URLLC), Massive Machine-Type Communications (mMTC), etc. Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

Figure 2:
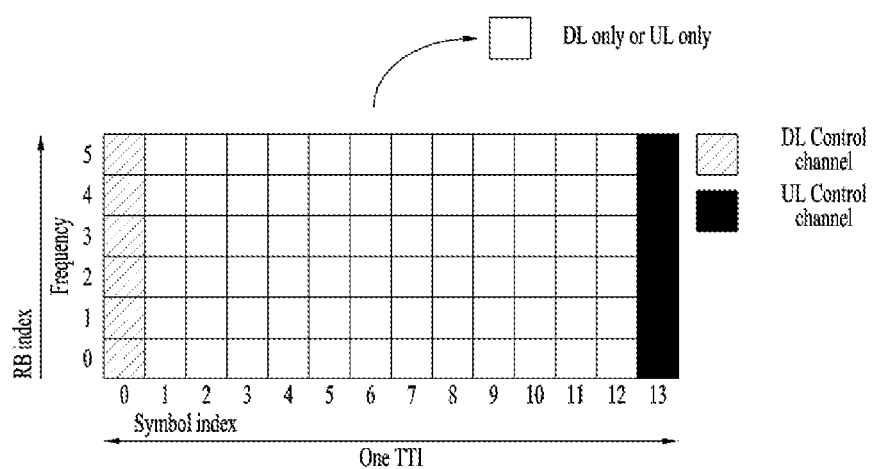
FIG. 2 is a diagram illustrating an exemplary subframe structure in which a data channel and a control channel are multiplexed in time division multiplexing (TDM)

FIG. 2 is a diagram illustrating an exemplary subframe structure in which a data channel and a control channel are multiplexed in time division multiplexing (TDM). In 5G NR, a frame structure in which a control channel and a data channel are multiplexed according to TDM like FIG. 2 may be considered in order to minimize latency.

In FIG. 2, the hatched area represents a transmission region of a DL control channel carrying DCI (e.g., PDCCH), and the last symbol represents a transmission region of a UL control channel carrying UCI (e.g., PUCCH). Here, the DCI is control information transmitted from a gNB to a UE and may include information on a cell configuration the UE should know, DL-specific information such as DL scheduling, UL-specific information such as a UL grant, etc. The UCI is control information transmitted from the UE to the gNB and may include a HARQ ACK/NACK report on DL data, a CSI report on a DL channel state, a scheduling request (SR), etc.

In FIG. 2, blank areas are available for flexible configuration of DL or UL periods to achieve DL/UL flexibility. For example, a blank area may be used as a data channel for DL data transmission (e.g., a physical downlink shared channel (PDSCH)) or a data channel for UL data transmission (e.g., a physical uplink shared channel (PUSCH)). This structure is characterized in that since a DL transmission and a UL transmission may be performed sequentially in one subframe, an eNB may transmit DL data in the subframe to a UE and receive an HARQ ACK/NACK signal for the DL data in the subframe from the UE. That is, the time required to retransmit data when a data transmission error occurs may be reduced, thereby minimizing the latency of final data transmission.

In the self-contained subframe structure, a time gap is necessary in order that the gNB and UE switch to a reception mode from a transmission mode, and vice versa. For the switching between the transmission mode and the reception mode, some OFDM symbols at the time of DL-to-UL switching may be configured as a guard period (GP) in the self-contained subframe structure.

Analog Beamforming

In a millimeter wave (mmW) band, the wavelength is shortened and thus a plurality of antennas may be installed in the same area. For example, a total of 100 antenna elements may be installed in a 5-by-5 cm panel in a 30 GHz band with a wavelength of about 1 cm in a 2-dimensional array at intervals of 0.5 lambda (wavelength). Therefore, in mmW, increasing coverage or throughput by increasing beamforming gain using multiple antenna elements is taken into consideration.

If a transceiver unit (TXRU) is provided to enable transmit power control and phase control per antenna element, independent beamforming per frequency resource is possible. However, installation of TXRUs in all of the about 100 antenna elements is less feasible in terms of cost. Therefore, a method of mapping a plurality of antenna elements to one TXRU and controlling the direction of a beam by an analog phase shifter may be considered. However, this analog beamforming scheme may generate only one beam direction in the whole band and, thus, may not perform frequency selective beamforming, which is disadvantageous.

As an intermediate form of digital beamforming and analog beamforming, hybrid beamforming with B TXRUs that are fewer than Q antenna elements may be considered. In hybrid beamforming, the number of beam directions in which beams may be transmitted at the same time is limited to B or less, which depends on how B TXRUs and Q antenna elements are connected.

Hybrid Beamforming

Figure 3:
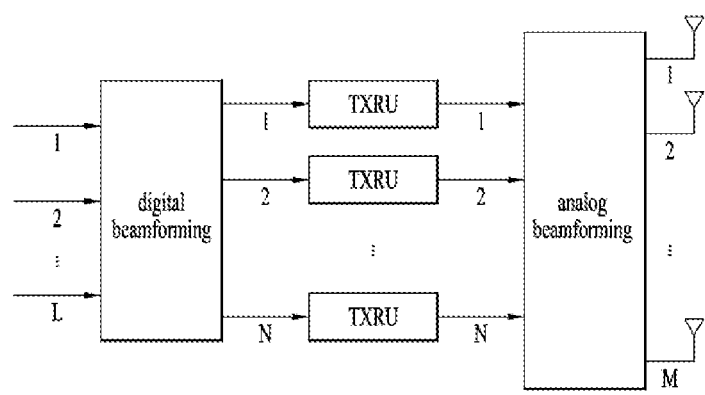
FIG. 3 is a block diagram illustrating hybrid beamforming.

FIG. 3 is a block diagram illustrating hybrid beamforming.

Figure 4:
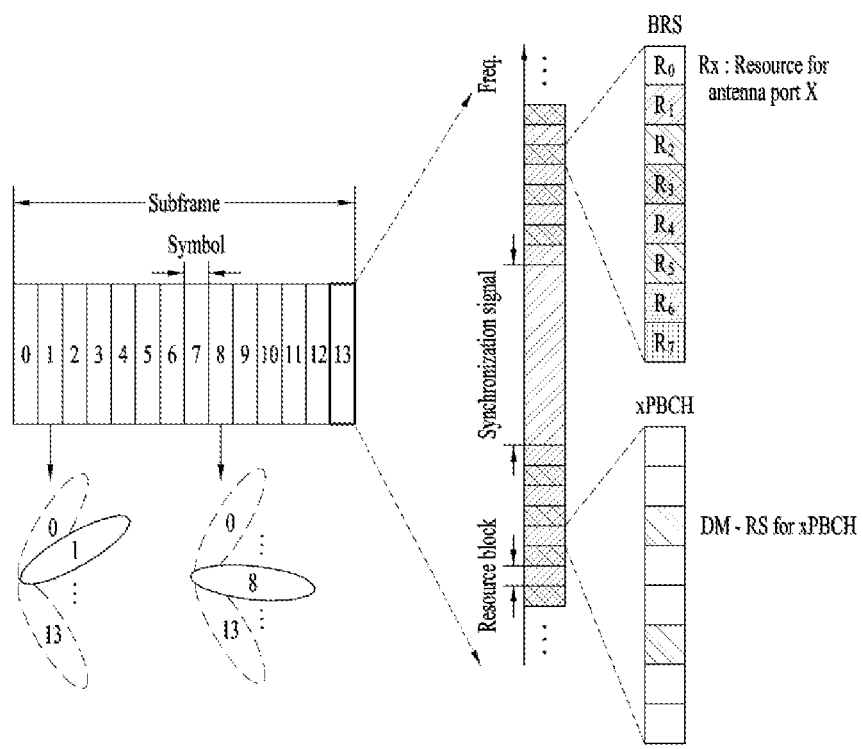
FIG. 4 is a diagram illustrating exemplary beams mapped to beamforming reference signal (BRS) symbols in hybrid beamforming.

When a plurality of antennas is used in the NR system, the hybrid beamforming scheme obtained by combining digital beamforming and analog beamforming has been used. In this case, analog (or radio frequency (RF)) beamforming means operation of performing precoding (or combining) at an RF unit. In the hybrid beamforming scheme, precoding (or combining) may be performed at a baseband unit and the RF unit. Thus, the hybrid beamforming scheme advantageously guarantees performance similar to the digital beamforming scheme while reducing the number of RF chains and digital-to-analog (D/A) (or analog-to-digital (A/D)) converters. As illustrated in FIG. 4, the hybrid beamforming structure may be represented by N TXRUs and M physical antennas, for the convenience of description. In this case, digital beamforming for L data layers to be transmitted by a transmitting end may be represented by an N×L matrix. Thereafter, N converted digital signals are converted into analog signals by the TXRUs and then analog beamforming, which may be represented by the M×N matrix, is applied to the converted signals.

FIG. 3 is a schematic illustration of a hybrid beamforming structure from the viewpoint of the TXRUs and physical antennas. In FIG. 3, the number of digital beams is L and the number of analog beams is N. In the NR system, a method for providing efficient beamforming to UEs located in a specific area by designing analog beamforming on a symbol basis by an eNB has been considered. Further, in FIG. 3, a method of introducing a plurality of antenna panels capable of applying independent hybrid beamforming by defining N TXRUs and M RF antennas as one antenna panel has been considered in the NR system.

When the eNB uses a plurality of analog beams, a different analog beam may be best for signal reception at each UE. Therefore, the eNB may consider a beam sweeping operation for at least a synchronization signal, system information, paging, or the like by applying a different analog beam to each symbol in a specific subframe (SF) so that all UEs may have reception opportunities.

FIG. 4 is a diagram illustrating exemplary beams mapped to beamforming reference signal (BRS) symbols in hybrid beamforming.

FIG. 4 is a schematic illustrating of a beam sweeping operation for a synchronization signal and system information in a DL transmission operation. In FIG. 4, a physical resource (or a physical channel) for broadcasting system information of the NR system may be referred to as a physical broadcast channel (xPBCH). In this case, analog beams belonging to different antenna panels may be simultaneously transmitted in one symbol. In addition, as illustrated in FIG. 4, the introduction of a BRS corresponding to an RS to which a single analog beam is applied has been discussed in order to measure a channel according to an analog beam. In this case, a single analog beam may imply a beam corresponding to a specific antenna panel. The BRS may be defined for a plurality of antenna ports and each antenna port of the BRS may correspond to a single analog beam. In this case, unlike the BRS, all analog beams in an analog beam group may be applied to the synchronization signal or xPBCH unlike the BRS to assist a random UE to correctly receive the synchronization signal or xPBCH. The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

CSI Feedback (Reporting) Method

In legacy LTE, a UE implicitly transmits a CSI feedback (e.g., a channel quality indicator (CQI) or a precoding matrix index (PMI)), and operates in closed-loop MIMO mode based on the CSI feedback. However, an increase in the number of antennas at a gNB and a UE is under consideration in NR. To achieve a higher multi-user MIMO (MU-MIMO) gain, an explicit feedback (e.g., pure channel, channel covariance matrix, or eigenvalue/eigenvector) transmission method as well as an implicit feedback method may be considered for the UE. However, because explicit feedback increases feedback overhead, it is preferable to transmit accurate feedback information with a minimized number of feedback bits.

Figure 5:
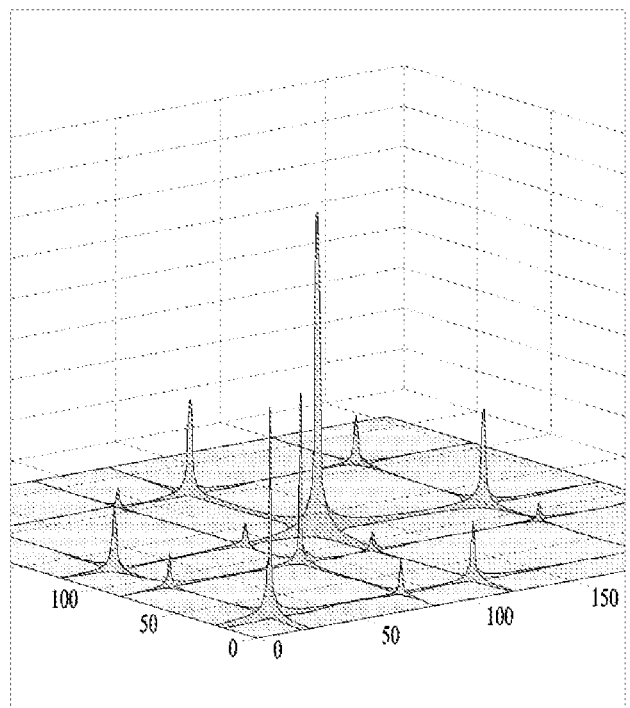
FIG. 5 is a diagram illustrating exemplary sparsity of the angular domain of a transmission (Tx) channel covariance matrix, for example, when 256 antennas are configured in millimeter wave (mmWave)

In a millimeter wave (mmWave) environment (e.g., above 6 GHz), channel sparsity tends to increase in the angular domain. FIG. 5 is a diagram illustrating exemplary angular-domain sparsity of a Tx channel covariance matrix, for example, when 256 antennas are configured in mmWave.

For efficient mmWave channel estimation, channel sparsity may be used. This is possible due to the characteristic of the mmWave channel that a very small number of valid paths exist. Further, although various methods are available for mmWave channel estimation, it is expected that use of a compressive sensing technique of detecting a sparse signal from a small number of observed values will be effective in view of the characteristic of the mmWave channel that a very small number of valid paths exist. The present disclosure applies the compressive sensing technique for mmWave channel estimation.

A digital feedback is considered for explicit feedback in the present disclosure. That is, it is assumed that a feedback is transmitted in the form of payload on a feedback channel (e.g., PUCCH in LTE). The notations of symbols to be used in the process of mmWave channel estimation are defined as follows in the present disclosure.

A: Sensing matrix (e.g., Gaussian random matrix or Bernoulli random matrix)

y: Feedback information vector (UE and gNB)

H: Channel matrix (or vector) that UE measures from DL RSs

F: Discrete Fourier transform (DFT) matrix (or steering matrix)

Q(.): Sparsity operation

^H: Hermitian operation

M(.): Quantization operation vec_sel(.): Vectorization of matrix with selection

Proposal 1) Method of Generating and Reporting Explicit Feedback Information by UE It is assumed that a UE has measured DL channels in RSs (e.g., CSI-RSs) received from a BS. The UE may perform a digital feedback to the BS based on the measured DL channel estimates in the following steps.

Step 1: The UE measures DL channels in RSs (e.g., CSI-RSs) received from the BS. Let the measured channel matrix be denoted by X. Then, X may be a covariance matrix or channel matrix of the channels. For the convenience of description, it is assumed that the size of the matrix X is M×K. While the following description is given with the appreciation that X is a covariance matrix, X may also be a channel matrix as mentioned above.

Step 2: The UE calculates a matrix V1 by multiplying the left and right sides of the matrix X by transform matrices T1 and T2 (which may be the same or different), respectively. That is, V1=T1*X*T2. The sizes of the transform matrices (e.g., DFT matrices) may be different according to the size of the matrix X. For example, the left matrix may be an M×M transform matrix T1 (e.g., DFT matrix), and the right matrix may be a K×K transform matrix T2 (e.g., DFT matrix).

Step 3: The UE performs a sparsity operation (or channel sparsity operation) to take the sparsity (or channel sparsity) of the (M×K) matrix V1 obtained in step 2. That is, the UE may calculate Q(V1) by using a channel sparsity function Q for the matrix V1. V2=Q(V1). The channel sparsity operation may be considered in two methods.

Method 1: The channel sparsity operation is to convert the values of the remaining elements except for L large-valued elements in the matrix V1 to zeroes.

Method 2: the channel sparsity operation is to convert the values of the remaining elements except for elements having values exceeding a specific threshold in the matrix V1 to zeroes.

Step 4: The UE calculates V3=M(V2) (where M is a quantization function) by quantization based on a matrix V2=Q(V1). That is, V3 may be an integer or a natural number.

Step 5: The UE may configure a vector having R elements in a predetermined pattern from V3, that is, the elements of the matrix by vec_sel(V3). R may be M×K including all matrix elements of V3. Alternatively, when the matrix X is a Hermitian matrix, R may be only the number of upper triangular elements. Further, the UE may configure a vector by selecting only a predetermined part associated with a channel sparsity part.

Further, a masking matrix, that is, a matrix with only intended elements being is and the remaining elements being 0s may be subject to element multiplication before the channel sparsity is taken in step 3. For example, the UE may subject an identity matrix to element multiplication by confinement to diagonal elements. Then, the UE may configure a vector corresponding to the size of only the corresponding diagonal elements in step 5.

Step 6: The UE calculates y by multiplying vec_sel(V3) by a sensing matrix A (y=A×vec_sel(V3)). Subsequently, the UE transmits y to the BS on a feedback channel (e.g., a digital feedback channel or the like). The reported y may be the size of a vector y. Herein, the sensing matrix A (of size P×R) may be a Bernoulli random matrix, that is, a matrix with elements being +1s or −1s. Further, y may also be an integer or a natural number and thus the UE may transmit y in bits to the BS. P is an observation size (the size of y) and the total amount of the feedback is P x (quantization bits per element).

In the above, the functions M, K, R, A, and Q may be determined or configured according to a system environment and already known to the UE and the BS.

Recovery of Received Explicit Feedback Information at BS

Now, a description will be given of a method of recovering X that a UE intends to transmit by a BS which has received an explicit feedback.

Step 1: The BS may acquire a value y from a feedback (e.g., PUCCH payload) received from the UE. Subsequently, the BS calculates an estimate of V3 based on the value y and a sensing matrix A and obtains hat_V3 by vec_sel^(−1), that is, by performing vec_sel reversely.

Step 2: The BS obtains hat_V2 from hat_V3 by M^(−1) (the reverse process of quantization).

Step 3: The BS may obtain final hat_X (i.e., an estimate of X) by multiplying T1^H and T2^H by the left and right sides of hat_V2, respectively.

In the above process, the sensing matrix A, the quantization method M, the channel sparsity operation Q, and vec_sel( ) may be pre-agreed between the BS and the UE or adaptively changed by signaling. Further, the same sensing matrix A may be generated at each feedback by sharing a seed number. The BS may transmit the seed number to the UE by RRC signaling or higher-layer signaling. Further, for example, P may be transmitted by RRC signaling or broadcasting system information.

Embodiment #1

It is assumed that the UE intends to transmit a Tx covariance matrix of channels to the BS. It is assumed that the channels are represented as a matrix H and the size of the matrix H is (the number of Rx ports at the UE x the number of Tx ports at the BS), that is, 4×256. An embodiment of each step will be described below.

First, the UE operates as follows.

Step 1: X is a Tx covariance matrix which may be obtained by E[H^H×H] and may be of size 256×256. That is, M=K=256.

Step 2: The UE applies DFT matrices of size 256 as transform matrices T1 and T2. When a DFT matrix of size 256 is denoted by F, V1=F^H×X×F.

Step 3: In a high frequency environment such as mmWave, channel sparsity is caused by the decrease of paths in number. Accordingly, dominant paths are limited. It is also assumed that only diagonal elements are taken. Therefore, off-diagonal terms are made 0s, and then the remaining elements except for L (=4) large-valued elements are all made 0s in a channel sparsity operation, Q(.).

Step 4: It is assumed that L (=4) element values from V2 obtained in step 3 are linearly quantized to 6 bits, and the maximum of the L element values is 64 because the covariance diagonal elements are real-valued. For example, if the four values are [63.01, 19.45, 8.34, 3.22], they are quantized to [63, 19, 8, 3]. To set 64 as the maximum value, the maximum value of elements in X may be limited by a CQI or the like.

Step 5: Because only the diagonal elements are taken, a vector with 256 elements in total is configured from V3 by vec_sel(V3). Eventually, a vector with the four elements of [63, 19, 8, 3] at specific element positions, i.e., indexes and the remaining elements being all 0s is obtained from the vector of length 256.

Step 6: Finally, if P is 16, the sensing matrix A is generated to be of size 16×256 with each element being +1 or −1, and the UE obtains y=A×vec_sel(V3). Then, each element of y ranges from +64 to −64. Therefore, the UE may feed back the value y with 7 quantization bits per element to the BS. Herein, the total feedback amount is 7×16 bits.

Upon receipt of the feedback, the BS performs the following procedure.

Step 1: The BS obtains y from payload and calculates an estimate of vec_sel(V3) from the sensing matrix A used by the UE (the same sensing matrix A is known to the BS by pre-agreement). That is, because channel sparsity is sufficient, the BS may obtain [63, 19, 8, 3] at four indexes in a vector of size 256. Subsequently, the BS obtains hat_V3 by performing the reverse process of vec_sel( ) on the vector.

Step 2: The BS obtains hat_V2 using hat_V3. Since a natural number is already quantized to a natural number in the corresponding example, there is no additional process. However, for example, when a technique of quantizing a complex value in PSK is used, the reverse process should be performed.

Step 3: An estimate hat_X of a final X may be obtained from F×hat_V2×F^H.

Proposal 1-1) Specific Details of Channel Sparsity Operation (Q(.)) in Step 3 of UE Method 1: The sparsity operation is to convert the remaining elements of the matrix V1 to 0s, except for L large-valued elements.

Method 2: The channel sparsity operation converts the remaining elements of the matrix V1 to 0s, except for elements with values exceeding a certain threshold value.

Proposal 1-2) Quantization Operation (M (.)) in Step 4 of UE

Figure 6:
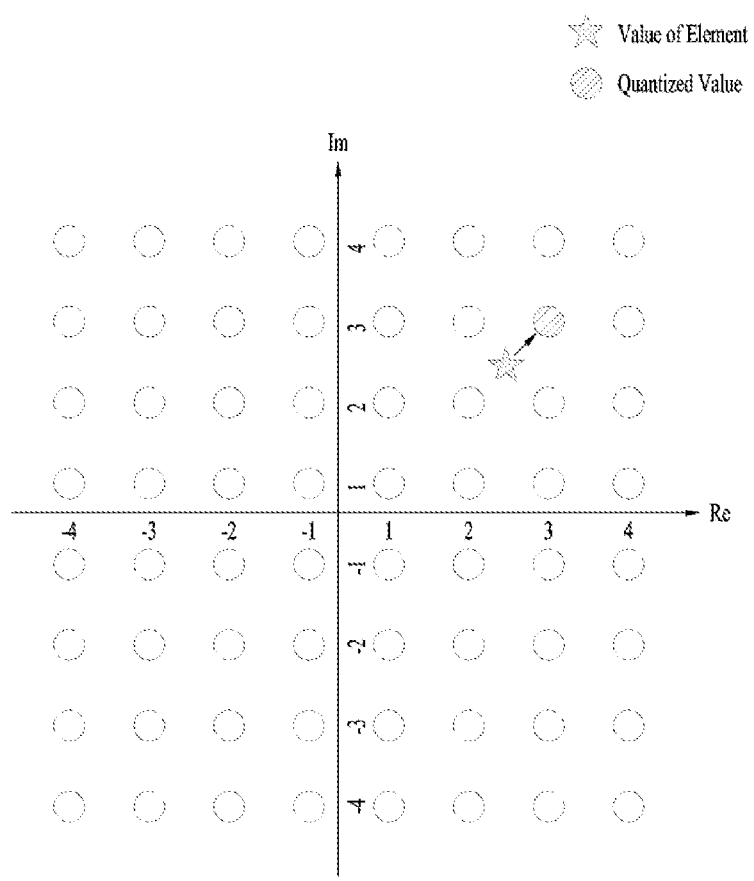
FIG. 6 is a diagram illustrating an exemplary method of quantizing non-zero values in a matrix V2.

FIG. 6 is a diagram illustrating a method of quantizing non-zero values in the matrix V2.

Method 1: Method of Quantizing Two-Dimensional (2D) Complex Values

In the case of 64-value quantization in FIG. 6, values may be expressed in 6 bits. Therefore, a total of L non-zero values are mapped to respective closest quantized value, and the corresponding indexes are obtained as result values. For example, if an element has a value of 2.7+2.8 j, the value is quantized to 3+3 j, and if the index of the quantization point is assumed to be 11, 2.7+2.8 j becomes 11 after the operation M(.). Since the BS has the same mapping rule, if an element value of hat_V3 is 11, the BS may interpret the value as 3+3 j. The maximum value of the non-zero elements may be limited by a CQI or the like, so that quantization may be performed within the mapping rule.

Method 2: Polar Quantization Method of Complex Values

As a method different from Method 1, the magnitude and angle of a complex value may be obtained, and then quantized in bits. For example, it is assumed that the magnitude is 3.2 and the angle is (1.2)/4*2 pi, the magnitude is quantized in 2 bits, that is, to one of 1, 2, 3, and 4, and the angle is quantized in 4 bits in 16 steps. Then, the complex value may have a magnitude of 3 and an angle of 4, and may become 3*16+4=52 after M(.). The BS may also interpret 52 as a magnitude of 3 and an angle of (¼)*2 pi in the same manner.

Method 3: When an element has only a real value, the maximum value of the element may be quantized only to a real value.

Method 4: Real value and complex value are co-existent.

For example, if the diagonal elements have only real values and the off-diagonal elements have complex values, quantization of the diagonal and off-diagonal elements in the same bits may reduce a quantization error in the real values because the transmitting side and the receiving side already know the corresponding structure. On the contrary, quantization may be performed such that the quantization size of the off-diagonal terms is doubled to have the same resolution as that of the diagonal elements.

Proposal 1-3) Signaling Technique Between UE and BS

The BS may indicate P and the quantization level of each element to the UE by RRC signaling, higher-layer signaling, or a system information block (SIB). The BS may indicate a sparsity L to the UE by RRC signaling. Alternatively, the UE may report a detected L after Q (.) to the BS according to a used technique. Because the receiving side has accurate knowledge of L, the reception performance may be improved.

In the above-described embodiments of the present disclosure, a feedback is transmitted only with dominant elements based on the channel sparsity property, rather than all elements of X are fed back. Therefore, feedback overhead may be reduced significantly.

Proposal 1-4) Correlation-Based Sparsity Operation Q( ) in Step 3 of UE

When the UE intends to transmit the channel covariance matrix and the pure channel matrix to the BS, a method of extracting a sparsity based on the correlation of each element of the DFT matrix V1 will be described below.

Further, a description will be given of a method of reducing feedback overhead by separately configuring data extracted by a sparse operation into (i) a container to be transmitted by compressed sensing and (ii) a container to be transmitted directly, based on the property that the index of each element of an intended original vector may be recovered in compressed sensing.

Case #1. X is a Channel Covariance Matrix

Figure 7:
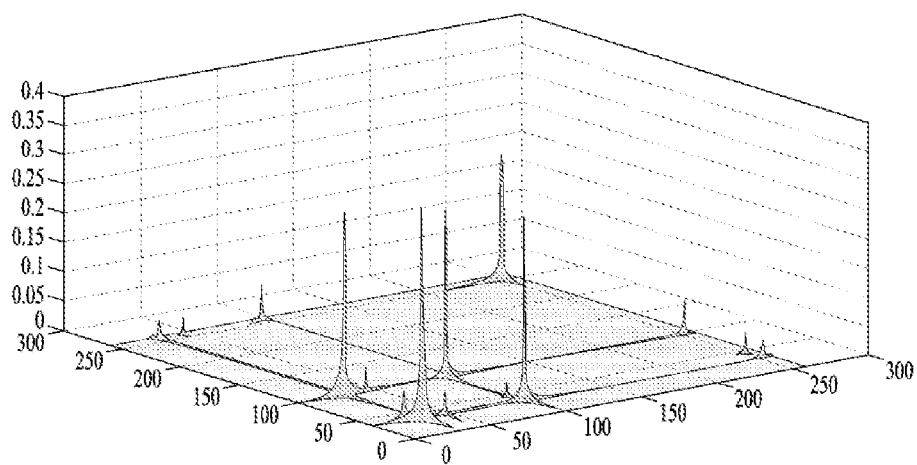
FIG. 7 is a diagram illustrating the value of each element in a matrix V1.
Figure 8:
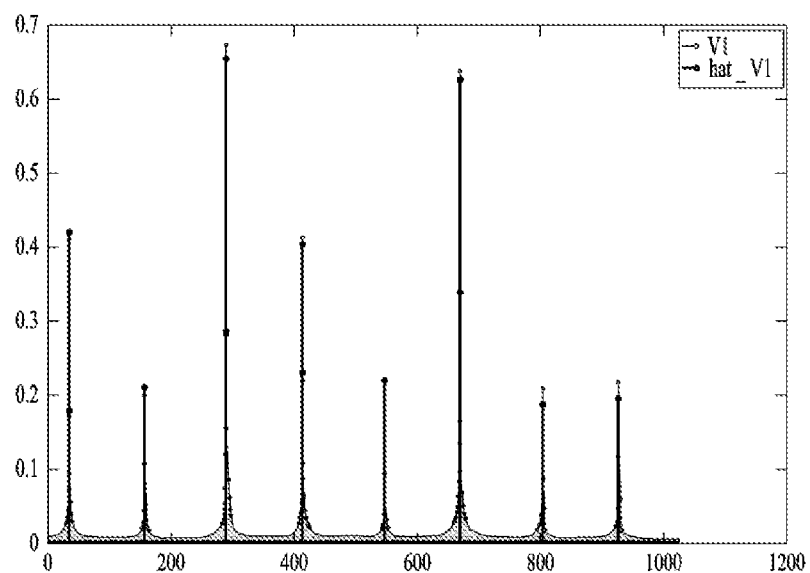
FIGS. 8 to 11 are diagrams illustrating V1 and hat_V1 depending on orthogonality and non-orthogonality between direction of arrival (DoA) and angle of arrival (AoA)
Figure 9:
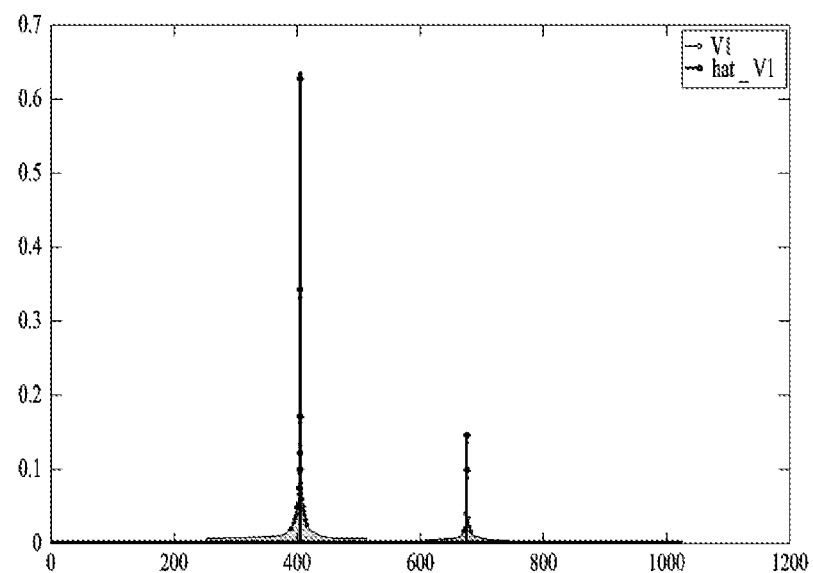
Figure 10:
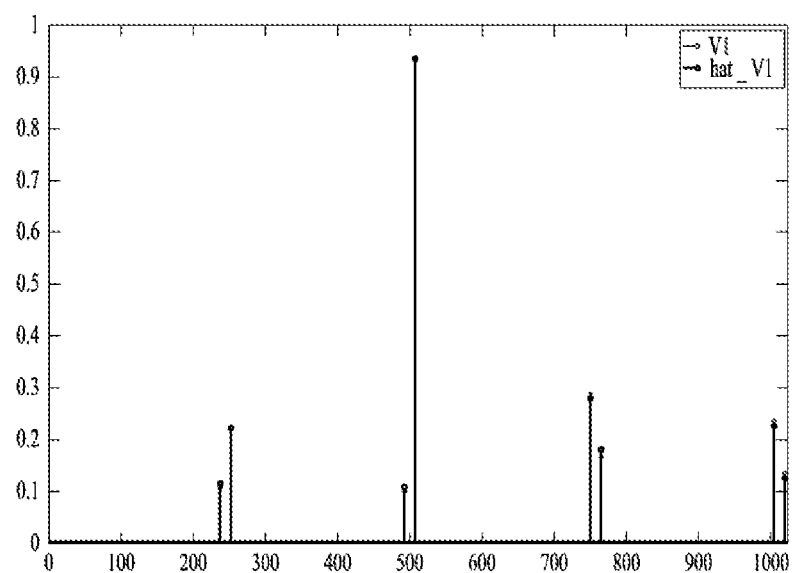
Figure 11:
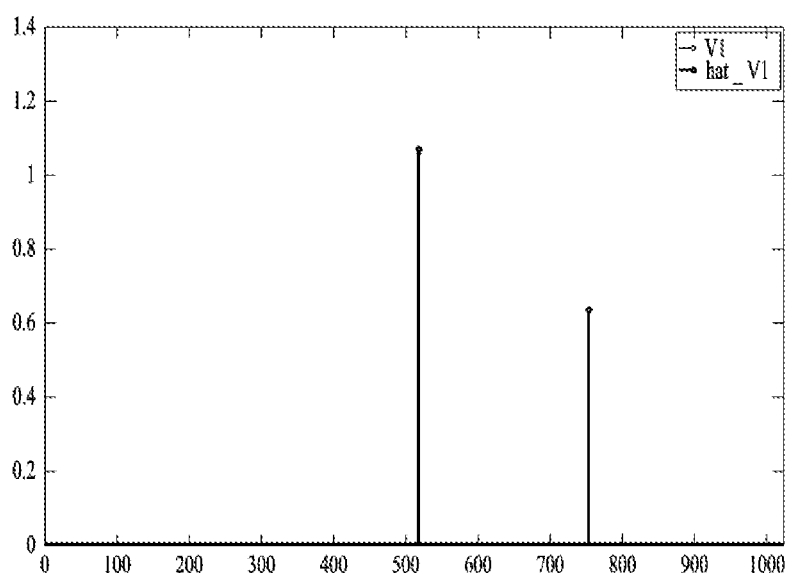

FIG. 7 illustrates the value of each element of the matrix V1. As illustrated in FIG. 7, non-zero values exist in various regions. In order to efficiently transfer the matrix V1, methods of performing a sparsity operation for effectively extracting non-zero values based on the correlation property of elements of the matrix V1 will be described.

Method 1: Method of Extracting L Elements from the Diagonal of V1 and Extracting $_LC_2$ Off-Diagonal Data by a Combination of Corresponding Indexes.

The element values of the matrix V1 have specific correlations due to non-orthogonality of DoA and non-orthogonality of AoA. In FIG. 7, energy spreading near a peak at the diagonal originates from the non-orthogonality of DoA, and the presence of a peak value at the off-diagonal originates from the non-orthogonality of AoA.

The indexes of peak values caused by the correlations may be covered greatly by a combination of the indexes obtained from the diagonal. Based on this property, off-diagonal data may be extracted as follows.

L indexes are extracted by performing a sparsity operation Q( ) on the diagonal of the matrix V1, and indexes are extracted from the L indexes by twos to extract data of corresponding (upper-triangular) off-diagonal indexes. Thus, $_LC_2$ additional data may be obtained.

For example, assuming that indexes a, b, c, and d (a<b<c<d) have been extracted from the diagonal, indexes to be extracted from the (upper-triangular) off-diagonal are (a, b), (a, c), (a, d), (b, c), (b, d), and (c, d).

Feedback bits are P* (quantized bits per element) where P should be greater than $2*(L+_LC_2)$ or $2*(L+2*_LC_2)$. One of the two conditions is determined depending on which quantization operation M( ) is used for the complex values of the corresponding indexes of the off-diagonal. For the quantization operation M( ), Method 1, Method 2, or Method 4 of Proposal 1-2 has been described.

Method 2: Method of Additionally Extracting Data in 'L' shape and '+' Shape From the Corresponding Indexes in Method 1

To gather more energy than in Method 1, more data may be obtained based on a specific pattern as follows.

N_chk data are extracted in upward and right directions ('L' shape) of the indexes of the diagonal elements of V1 and in upward, downward, left, and right directions ('+' shape) of the (upper-triangular) off-diagonal indexes extracted in Method 1. In this manner, N_chk*(L+$_2C_L$) more data may be extracted, compared to Method 1.

For example, assuming that N_chk is 8, four data may be obtained in each of the top to right directions of the diagonal indexes, and two data may be obtained in each of the top down and left to right directions of the non-diagonal indexes.

Feedback bits are P* (quantized bits per element) where P should be larger than $2*(L+_LC_2+(N\_chk*(L+_2C_L)))$ or $2*(L+2*(_LC_2+(N\_chk\times(L+_2C_L))))$ for the same reason as in Method 1.

Method 3: Method of Separately Configuring Container for Compressed Sensing and Container for Direct Delivery From $(L+_LC_2)$ Data Extracted in Method 1.

As described in step 6 of Proposal 1, the feedback vector y is made up of A*vec_sel(V3). On the other hand, since the feedback vector y increases linearly with the size of the observation time P, it is obvious from the viewpoint of the subject matter of the present disclosure seeks that the size of P should be small. If V3 is configured based on Method 1, P should be kept larger than $2*(L+_LC_2)$ or $2*(L+2*_LC_2)$ depending on the condition of compressed sensing.

Method 3 proposes a method of reducing P which is a factor determining the number of feedback bits. Method 3 is based on the fact that compressed sensing restores not only the value of each element, but also each corresponding index.

The UE configures vec_sel(V3) including information about L data extracted from the diagonal of the matrix V1 as a container for compressed sensing, and directly delivers $_LC_2$ data extracted from the off-diagonal. Therefore, only the components extracted from the diagonal are transmitted in the form of the feedback vector y=A*vec_sel(V3), whereas the $_LC_2$ data extracted from the off-diagonal are directly delivered regardless of A.

It may be pre-agreed that the UE and the BS that when $_LC_2$ data are ordered, "the $_LC_2$ data are ordered in ascending order by row". However, there may be various methods such as ordering in ascending order by column.

For example, if L indexes extracted from the diagonal are 1, 2, 3, and 10, it may be pre-agreed between the UE and the BS that $_LC_2$ indexes, that is, 6 indexes extracted from the off-diagonal are ordered in the ascending order by row, thus (1,2), (1,3), As (1,10), (2,3), (2,10), and (3,10).

In step 1 (i.e., the process of recovering hat_V3) of the operation of the BS in Proposal 1, the BS may have knowledge of the diagonal indexes. Thus, the directly delivered off-diagonal $_LC_2$ data are sequentially mapped to the indexes determined on the upper-triangular off-diagonal of hat_V3 obtained in step 1 of the BS according to the pre-agreed ordering rule. Method 3 is advantageous in that there is no need for separately reporting the indexes of the off-diagonal-related $_LC_2$ data.

Feedback bits are P*(quantized bits per element)+$_LC_2$*(quantized bits per element). Here, P should be larger than 2*L, but it is obvious that it may be secured smaller than P in Method 1. Assuming that the same value is applied as the quantized bits per element, Method 3 may reduce feedback bits, relative to Method 1.

Method 4: Method of Separately Configuring Container for Compressed Sensing and Container for Direct Delivery From $L+_LC_2+(N\_chk*(L+_2C_L))$ Data Extracted in Method 2

Method 4 proposes that vec_sel(V3) including L data extracted from the diagonal is configured as a container for compressed sensing, and $_LC_2+(N\_chk*(L+_2C_L))$ data extracted from the off-diagonal are delivered directly.

Therefore, the UE transmits only the components extracted from the diagonal in the form of the feedback vector y=A*vec_sel(V3), and directly delivers $_LC_2+(N\_chk*(L+_2C_L))$ data extracted from the off-diagonal regardless of A.

As described in Method 3, it may be pre-agreed between the UE and the BS that when $(N\_chk*(L+_2C_L))$ data are concatenated, the ordering rule is that "L*N_chk data near the diagonal' are first extracted in upward and right directions, and then 2CL*N_ch data are concatenated in upward, right, downward, and left directions".

In the process of recovering hat_V3 in step 1 of the BS, the BS may automatically obtain information about the indexes to be handled. Thus, the directly delivered off-diagonal $_LC_2+(N\_chk\times(L+_2C_L))$ data may be sequentially mapped to the upper-triangular off-diagonal indexes of hat_V3 obtained in step 1 of the BS, based on the above ordering rule. Method 4 is advantageous in that there is no need for separately reporting the indexes of the directly delivered off-diagonal-related $_LC_2+(N\_chk*(L+_2C_L))$ data.

Feedback bits are P*(quantized bits per element)+$_LC_2+(N\_chk*(L+_2C_L))$*(quantized bits per element) where P should be larger than 2*L. However, it is obvious that P smaller than in Method 2 may be secured. Assuming that the quantized bits per element is applied with the same value, method 4 may reduce feedback bits, relative to Method 2.

Case #2. X is Pure Channel Matrix

Method 1: Method of Extracting L Dominant Data Based on Values of Elements in V1 and Separately Configuring Vector Corresponding to Real Value and Vector Corresponding Imaginary Value From L Dominant Data According to Method 1, the UE extracts L indexes by performing the sparsity operation Q( ) based on the values of elements in the entire matrix V1. The UE extracts real values of the corresponding indexes and performs vec_sel (M(Q(V1))) to configure a (N*M)×1 vector.

The UE performs the above step for the imaginary value to configure a (N*M)×1 vector, and then concatenates the real-valued vector. As a result, the UE obtains a (2*N*M)×1 vector and multiplies this vector by A to configure a feedback vector y.

Feedback bits are P*(quantized bits per element) where P should be greater than 2*2*L. Since L complex values are divided into a real part and an imaginary part, it is shown to be sparsity of 2*L in (2*N*M)-by-1 vector and thus P should be greater than 2*2*L.

The above-described step may also be applied to polar coordination by replacement with a vector representing the magnitude of each element and a vector representing the phase of each element.

Method 2: Method of Transmitting Only One of Two Vectors Configured in Method 1 by Compressed Sensing and Directly Delivering the Other Vector According to Method 2, the UE extracts L indexes by performing the sparsity operation Q( ) based on the values of elements in the entire matrix V1. The UE extracts real (or imaginary) values of the corresponding indexes and performs vec_sel (M(Q(V1))) to configure a (N*M)×1 vector (for compressed sensing).

The UE configures an L×1 vector by sequentially concatenating the imaginary (or real) values corresponding to the L indexes in the ascending order of the indexes (for direct delivery).

First, data is recovered through the vector y (=A*vec_sel (M(Q(V1)))) and the matrix A transmitted by compressed sensing, and hat_V3 is recovered by sequentially combining the element values of the directly delivered vector with the data recovered by compressed sensing at the recovered indexes.

Method 2 may also be applied to polar coordination by replacement with a vector representing the magnitude of each element and a vector representing the phase of each element.

Feedback bits are P*(quantized bits per element)+L* (quantized bits per element) where P should be greater than 2*L. However, P in Method 1 should be greater than 2*2*L. Therefore, if the same quantization bits per element are applied in Method 1 and Method 2, fewer feedback bits may be configured in Method 2.

Proposal 1-5) Technique of Configuring V and Selecting T1 and T2 Based on Orthogonality of DoA and AoA in Step 2 of UE

[Motivation]

Proposals 1-5 to 1-6 to be described below are intended to complete the matrix X (pure channel matrix or channel covariance matrix) to have a minimum error through a small amount of feedback information.

The UE shares the steering matrices T1 and T2 with the BS, configures V1 in a steering process of V1=T1*X*T2, and feeds back by using compressed sensing appropriately based on the angular-domain sparsity property of V1.

That is, if the UE is capable of completely feeding back V1 without loss, the BS may complete X perfectly by a process of X=T1^H*V1*T2^H.

In view of the limitation of the estimation resolution of DoA and AoA for each path of X (pure channel matrix or channel covariance matrix), however, non-orthogonality between DoA and AoA occurs, which may cause the following problems.

[Observation]

For the convenience of description, a scenario in which the UE feeds back the pure channel matrix to the BS is assumed.

X: Pure channel matrix, the number S of multiple paths: 2, the number M of BS antennas: 256, and the number N of UE antennas: 4

V1: Vector obtained by performing a steering operation T1×X×T2, and concatenating the rows of the corresponding matrix.

hat_V1: After feedback of the UE, if V1 interpreted by the BS has no error (no error caused by compressed sensing), hat_V1=M(Q(V1)). hat V1 is related to steps 3 and 4 of the UE in Proposal 1.

Orthogonal DoA: When DoA is an integer multiple of the orthogonality resolution of DoA (=2 pi/M)

Orthogonal AoA: When AoA is an integer multiple of the orthogonality resolution of AoA (=2 pi/N)

FIGS. 8 to 11 illustrate V1 and hat_V1 (=M(Q(V1))) depending on orthogonality of DoA and AoA. In FIGS. 8 to 11, the horizontal axis represents M*N×1 indexes, and the vertical axis represents the values of elements.

As illustrated in FIGS. 8 to 11, from the perspective of V1, non-orthogonality of DoA causes an energy spread phenomenon around the index of a dominant path, whereas non-orthogonality of AoA causes a phenomenon that (N−1) duplications per each dominant path are shown.

That is, these non-orthogonality properties of DoA and AoA degrade the efficiency of the sparsity operation Q( ) and the quantization operation M( ), thereby decreasing the similarity between V1 and hat_V1. Therefore, even if hat_V1 is perfectly transmitted by compressed sensing, an error may occur in matrix completion.

[Ideation]

There are limitations in configuring and feeding back hat_V1 with V1 which is configured with the fixed steering matrices T1 and T2 due to non-orthogonality of DoA and AoA in X and limiting factors (e.g., the number L of data gathered during Q( ), quantization bits per element during M( ), and the numbers of antennas at the BS and the UE, which determine the estimation resolutions of DoA and AoA) determined in the system.

Therefore, instead of finding hat_V1 closest to the fixed matrix V1, a method of making hat_V1 approach V1 as much as possible, while modifying V1 itself may be considered.

In this regard, the present disclosure proposes a method of applying optimal angle offsets within [0, 2 pi/N), [0, 2 pi/M), respectively, while maintaining the orthogonality resolutions of the steering matrices T1 and T2, in order to configure V1 which minimizes errors caused by non-orthogonality of DoA and AoA. First, parameters may be defined as follows.

m: Number of angle offset levels for DoA estimation n: Number of angle offset levels for AoA estimation {T1_1, T1_2, . . . , T1_m}: A set of candidate steering matrices for DoA estimation (T1_k is a steering matrix obtained by applying an angle offset of ((k−1)/m)*(2 pi/M) to T1(=T1_1)).

{T2_1, T2_2, . . . , T2_n}: A set of candidate steering matrices for AoA estimation (T2_k is a steering matrix obtained by applying an angle offset of ((k−1)/n)*(2 pi/N) to T2(=T2_1)).

{alpha_1, alpha_2, . . . , alpha_S}: A set of values representing the differences between DoA values and actual DoA values, when an angle offset is not applied, that is, for each path estimated to be T1_1 (alpha_k ∈ [0, 2 pi/M)).

{beta_1, beta_2, . . . , beta_S}: A set of values indicating the differences between AoA values and actual AoA values, when an angle offset is not applied, that is, for each path estimated to be T2_1 (beta_k ∈ [0, 2 pi/N))

That is, the present disclosure proposes a method of minimizing the difference between hat_V1 and V1, which are values determined by {alpha_1, . . . , alpha_S} and {beta_1, . . . , beta_S}. According to one aspect of the present disclosure, V1 may be designed, which minimizes |V1-hat_V1| or a mean square error (MSE). However, the metric indicating the difference between V1 and hat_V1 is not limited to the above metric, and it is obvious that the same may be applied to other metrics. This is achieved by finding optimal angle offset indexes, m*(∈{1, . . . , m}) and n*(∈{1, . . . , n}).

Proposal 1-5-1) Method of Selecting Numbers of Angle Offset Levels, m and n

First, a description will be given of a method of selecting m and n, which are numbers of angle offset levels. The numbers of angle offset levels, M and n may be values which should be known both the BS and the UE.

In a single path scenario (S=1), as m and n values increase, intensive alignment in one path is possible, thereby increasing a performance gain. In a multipath scenario, however, since the DoA value (or AoA value) of each path is generated independently, it may not be said clearly that the performance gain increases with m (or n). Therefore, it is desirable to set appropriate bounds for m and n and limit resources for transmitting them.

In the present disclosure, it is pre-agreed between the UE and the BS that the numbers of angle offset levels, m and n are selected from among $\{2^0, 2^1, 2^2, 2^3, 2^4, 2^5, 2^6, 2^7\}$. Thus, both indication_m and indication_n used to indicate m and n may be selected from among {0, 1, 2, 3, 4, 5, 6, 7}, and operated in a fixed container of 3(=$\log_2 8$) bits. In the above description, the maximum value, $2^7$ is exemplary, and $2^K$ (an integer greater than or equal to K=0) may be the maximum value.

The following three methods are proposed according to entities that determine m, n, indication_m, and indication_n.

Method 1: The BS may configure each of indication_m and indication_n in 3 bits and indicate the number m of DoA angle offset levels and the number n of AoA angle offset levels to the UE by transmitting indication_m and indication_n in a higher-layer signal (e.g., RRC signaling, an SIB, or the like) or dynamically in DCI.

Method 2: The UE may configure each of indication_m and indication_n in 3 bits and indicate the number m of DoA angle offset levels and the number n of AoA angle offset levels to the BS by feeding back indication_m and indication_n. For example, the UE may feed back indication_m=[5] and indication_n=[4] to the BS, and the BS may recognize the number m of angle offset levels for DoA as $2^5$ and the number n of angle offset levels for AoA as $2^4$.

Method 3: To reduce additional signaling overhead, the number m of DoA angle offset levels and the number n of AoA angle offset levels may be pre-configured as fixed values between the BS and the UE.

Proposal 1-5-2) Cost Function Production Technique to Find Optimal Angle Offset Index m*(∈{1, . . . , m}) and n*(∈{1, . . . , n})

Once the numbers m and n of angle offset levels are determined in the afore-described Proposal 1-5-1, the UE should determine optimal angle offset indexes m*(∈{1, . . . , m}) and n*(∈{1, . . . , n}). This means detecting (m*, n*)=argmin C(V1), and a cost function CO may be designed in the following methods.

For the convenience of description, abs(a) is defined as a function for conversion to the element values of a vector (or matrix) a. Intuitively, when abs(V1) is plotted, it is desirable from the viewpoint of the subject matter of the present disclosure to minimize energy spreading near dominant element values by giving a sharp shape. According to the present disclosure, the gain of the sparsity operation Q( ) which takes L dominant element values in V1 may be maximized. Further, according to the present disclosure, an observation time P(>2*L) required for compressed sensing may be reduced, and as a result, the number of feedback bits may be reduced. Proposal 1-5-2 proposes the following methods.

Method 1: The cost function C( ) is designed as the sum of abs(V1).

Method 2: The cost function C( ) is designed as the variance of 1/abs(V1).

Method 3: The cost function C( ) is designed as the number of element values of abs(V1) greater than a preset threshold value.

Method 4: If the index of the maximum element value of abs(V1) is max_index, the cost function C( ) is designed as (abs(V1(max_index−1))+abs(V1(max_index+1)))/abs(V1(max_index)).

Method 5: The cost function C( ) is designed as the total sum of the element values of |abs(V1)-abs(M(Q(V1)))|.

Detecting m* and n* in one of the above-described methods means that V1 given by V1=T1_$n^*$ *X*T2_$m^*$ is determined as V1 easy to be transmitted, followed by M(Q(V1)) based on V1.

Proposal 1-5-3) Index Search Technique for Detecting Optimal Angle Offset Indexes m*($\in \{1, \ldots, m\}$) and n*($\in \{1, \ldots, n\}$)

If the result of calculating the cost function in the afore-described Proposal 1-5-2 is Y, Y may be derived in the form of an m×n matrix. Herein, optimal angle offset indexes (m*, n*) may be detected in the following methods.

Method 1: The angle offset indexes (m*, n*) are detected by searching all m×n elements of Y.

Method 2: After a DoA angle offset index is initialized to an arbitrary value, the optimal AoA angle offset index n* (e.g., n*=argmin(Y), where the size of Y is 1×n), and the optimal DoA angle offset index m* (e.g., m*=argmin(Y), where the size of Y is m×1), while n* is fixed.

Method 3: After an AoA angle offset index is initialized to an arbitrary value, the optimal DoA angle offset index m* (e.g., m*=argmin(Y), where the size of Y is 1×n), and the optimal AoA angle offset index n* (e.g., m*=argmin(Y), where the size of Y is m×1), while m* is fixed.

Despite the greatest complexity, Method 1 has the highest performance, while Method 2 and Method 3 have lower performance than Method 1, but with smaller complexity than Method 1.

Figure 12:
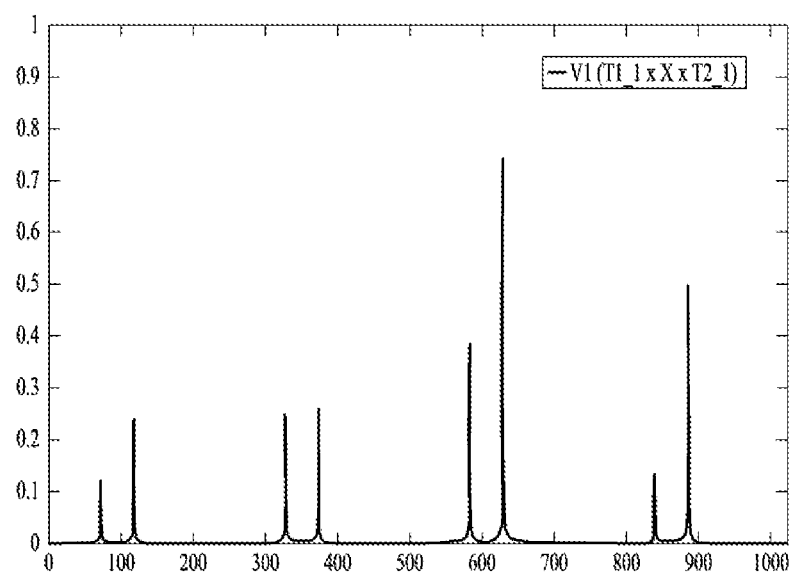
FIGS. 12 to 15 are diagrams illustrating sharpness of abs(V1) according to angle offset implementation results.
Figure 13:
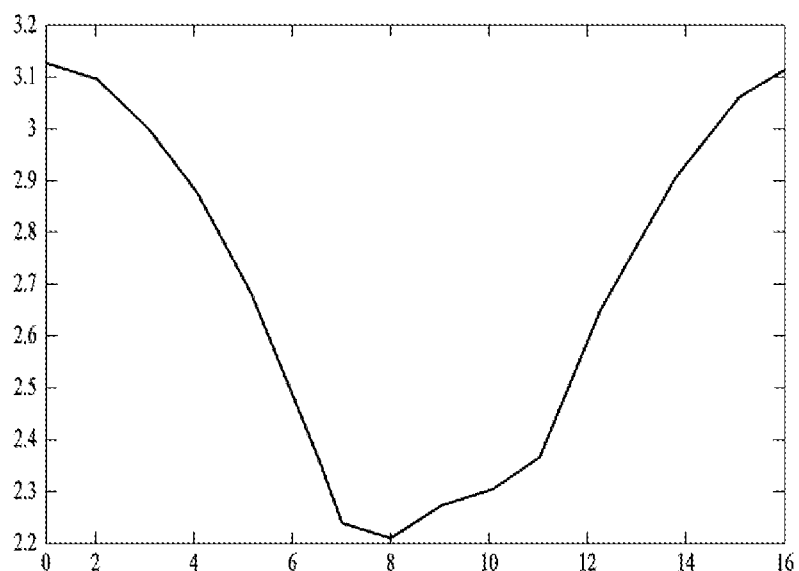
Figure 14:
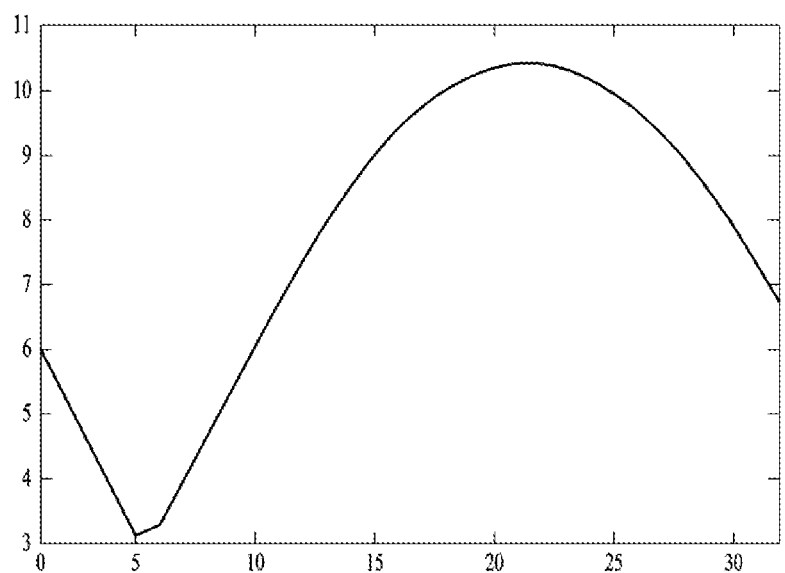
Figure 15:
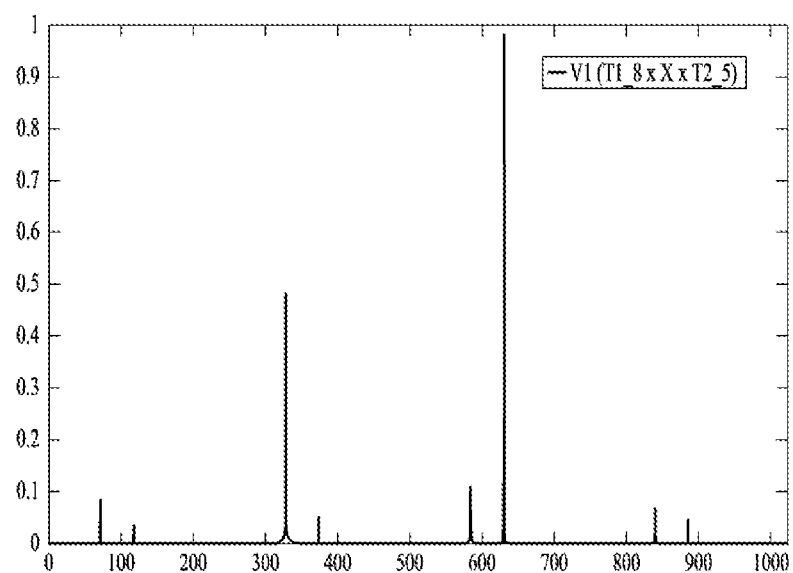

FIGS. 12 to 15 are diagrams illustrating the sharpness of abs(V1) according to the results of angle offset implementation. Specifically, FIG. 12 illustrates a case in which V1=T1_1*X*T2_1, FIG. 13 illustrates a cost function of detecting an optimal AoA angle offset index (e.g., n*=8) after a DoA angle offset index is fixed to 1 (e.g., T2_1), FIG. 14 illustrates a cost function of detecting an optimal DoA angle offset index (e.g., m*=5) after an AoA angle offset index is fixed to n* (e.g., T1_8), and FIG. 15 illustrates a case in which V1=T1_8*X*T2_5.

Particularly, FIGS. 12 to 15 illustrate that when S=2, m=32, n=16, the cost function is set to Method 1 of Proposal 1-5-2, and index search is performed according to Method 2 of Proposal 1-5-3, (m*, n*)=(5, 8) is selected. This means that V1 given by V1=T1_8*X*T2_5 has a better sparsity property than V1 given by V1=T1_1*X*T2_1, and thus is easy to transmit.

A comparison between FIGS. 12 and 15 reveals that there is a difference in energy spreading near a dominant element value, which causes a difference in matrix completion performance.

Proposal 1-5-4) Feedback Container Design Technique for Transmitting Numbers of Angle Offset Levels, m and n, and Optimal Angle Offset Indexes, m*($\in\{1, \ldots, m\}$) and n*($\in \{1, \ldots, n\}$)

In order to achieve the object of the present disclosure, a description will be given additionally of how a feedback container should be designed. For the convenience of description, a feedback container and the size of the container are expressed as [contents(x bits)]. Three methods according to Proposal 1-5-4 will be described.

Method 1: After receiving indication_m and indication_n each being 3 bits by high-layer signaling (e.g., RRC signaling, an SIB, or the like) or dynamic DCI from the BS, the UE may configure a feedback container [indication_m* (indication_m bits][indication_n*(indication_n bits)].

Particularly, indication_m* is a binary representation of index m* in indication_m bits, and indication_n* is a binary representation of index n* in indication_n bits.

Method 2: When the UE feed backs indication_m and indication_n each in 3 bits, the UE may configure a feedback container [indication_m(3 bits)][indication_n(3 bits)] [indication_m*(indication_m bits)][indication_n*(indication_n bits)], which may be transmitted via RRC or UCI.

Method 3: When m and n are fixed values, a feedback container may be configured as [indication_m*($\log_2$m bits)] [indication_n*($\log_2$n bits)].

In Method 2, for example, when the UE configures and feeds back [1 0 1] [1 0 0] [0 0 1 0 1] [1 0 0 0] as [indication_m(3 bits)] [indication_n(3 bits)] [indication_m* (indication_m bits)] [indication_n*(indication_n bits)], the BS may interpret m=5, n=4, m*=5, and n*=8. That is, 3 bits are fixed to write each of [indication_m (3 bits)] and [indication_n (3 bits)], and based on the values of [1 0 1] and [1 0 0], [indication_m*(indication_m bits)] [indication_n* (indication_n bits)] may be parsed as [0 0 1 0 1] and [1 0 0 0].

The UE may configure an intended V1 in a form suitable for transmission by finally configuring V1= T1_$n^*$ *X*T2_$m^*$ based on m* and n*. Further, the BS may complete X with hat_X by performing hat_X=T1_$n^*$^H*M (Q(V1))*T2_$m^*$^H.

The present disclosure may be applied not only when X is a pure channel matrix, but also when X is a channel covariance matrix. Specifically, when X is a channel covariance matrix, a vector configured by extracting only the diagonal components of V1 (of size M×M) or a vector configured by extracting upper-triangular values including the diagonal components may be interpreted and applied as the afore-described V1.

Further, according to the present disclosure, since information related to AoA is not included, feedback information related to AoA, ([indication_n (3 bits)], [indication_n*(indication_n bits)]) and related processes may be omitted. Further, according to the present disclosure, it may be expected to improve the performance of matrix completion by maximizing the sparsity property of V1 to be transmitted through proper manipulation of the steering matrices.

Proposal 1-6) V1 Configuration in Step 2 of UE, and Modification of Proposal 1-5 Based on Independency of Each Multi-Path Component The afore-described Proposal 1-5 is a method of considering S paths simultaneously at one shot, when V1 leading to a minimum |V1-hat_V1| determined by {alpha_1, ..., alpha_S} and {beta_1, ..., beta_S}, in which one optimal angle offset index m*($\in \{1, \ldots, m\}$) or n*($\in \{1, \ldots, n\}$) is detected.

According to Proposal 1-5, since the effect on S paths is observed on average, when the size of a dominant path is larger than other paths or the element values of {alpha_1, ..., alpha_S} are similar, high performance is achieved. In the opposite case, when the paths are very similar in size and the similarity of the element values of {alpha_1, ..., alpha_S} decreases, performance may degrade.

Because the matrix X (=pure channel matrix) is in the form of S independent channels superposed on each other (the pure channel matrix H=H_1+H_2+ ... +H_S), it may be possible to extract {alpha_1, beta_1}, ..., {alpha_S, beta_S} for each independent channel. Therefore, Proposal 1-6 propose the following UE process.

Step 1: The BS and the UE recognize the numbers m and n of angle offset levels by performing Proposal 1-5-1.

Alternatively, a behavior of adaptively setting { ..., m_k, ... } and { ..., n_k, ... } according to the degree of orthogonality of each of multiple paths is also possible.

Step 2: The UE calculates [indication_m*(indication_m bits)] [indication_n*(indication_n bits)] and a corresponding V1 (=T1_$n$* * X*T2_$m$*) for a first dominant path by Proposals 1-5-2 and 1-5-3. It is also possible to separately interpret indication_m* and indication_n* even if the numbers m and n of adaptive angle offset levels are set adaptively for each path.

Step 3: Components for the first dominant path are removed by X-(T1_$n$*^H*V1*T2_$m$*^H), and the result is newly set as X.

Step 4: Steps 2 and 3 are repeated until the energy of X-(T1_$n$*^H*V1*T2_$m$*^H) becomes equal to or less than a certain threshold, and the number of iterations is set to hat_S. Further, it may be preconfigured between the BS and the UE that the representation of hat_S is limited to s bits, for configuring a feedback container, so that information about up to 2^s multiple paths is transmitted.

Step 5: The UE feeds back, to the BS, a vector obtained by concatenating a container [hat_S (s bits)] indicating the number of paths and a container [indication_m* (indication_m bits)] [indication_n*(indication_n bits)] indicating 2^s optimal angle offset indexes in total. When hat_S<2^s, all of [indication_m* (indication_m bits)] [indication_n* (indication_n bits)] from (hat_S+1)$^{th}$ to 2^s$^{th}$ are zeroes. For an efficient operation, the BS may transmit an s value to the UE by higher-layer signaling (e.g., RRC signaling, an SIB, or the like) or by dynamic DCI, in relation to how many paths should be interpreted as dominant in the system.

Step 6: A vector obtained by concatenating as many matrices V1 as hat_S obtained in Step 4 is newly interpreted as V1, and then M (Q(V1)) is transmitted through compressed sensing. The size of the new V1 is (hat_S*N*M)×1. In this case, when compressed sensing is applied, the size of the sensing matrix A is P×(hat_S*N*M).

After the above-described process of the UE, the BS may perform the following process.

Step 1: hat_V1 (=M (Q(V1))) is recovered.

Step 2: as many hat_V1s as hat_S1 are configured by sequentially dividing hat_V1 into hat_S parts by a received container [hat_S (s bits)] indicating the number of paths.

Step 3: The first to hat_s$^{th}$ ones of a total of 2^s received {[indication_m* (indication_m bits)] [indication_n*(indication_n bits)]}'s are extracted.

Step 4: Each of a total of hat_S {hat_X=T1_$n$*^H*hat_V1*T2_$m$*^H}'s is calculated, the values are summed, and thus X is completed with the final hat_X.

According to Proposal 1-6, the amount of feedback may increase slightly, compared to Proposal 1-5. However, since DoA and AoA are estimated for each of independent multipath components, it is possible to intensively align to one individual path, and thus improvement of the performance of matrix completion may be expected.

Figure 16:
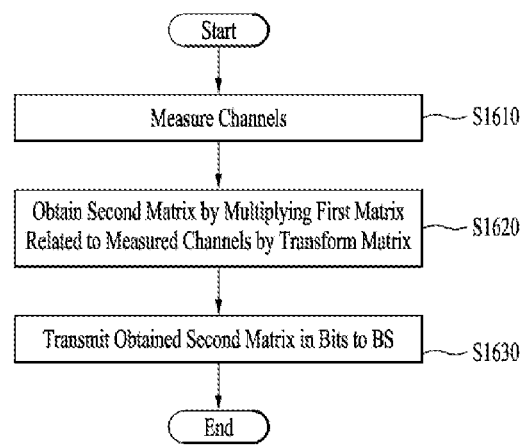
FIG. 16 is a diagram illustrating a method of transmitting feedback information by a user equipment (UE) according to an aspect of the present disclosure.

FIG. 16 is a diagram illustrating a method of transmitting feedback information by a UE according to an aspect of the present disclosure.

The method of transmitting feedback information illustrated in FIG. 16 may include measuring channels (s1610), obtaining a second matrix by multiplying a first matrix related to the measured channels by a transform matrix (s1620), and transmitting the second matrix in bits to a BS (s1630). The transform matrix may be determined based on an angle offset satisfying a predetermined condition.

According to another aspect of the present disclosure, when orthogonality of DoA and AOA of the first matrix is maintained, the predetermined condition may be satisfied, and the angle offset may include an angle offset for the DoA and an angle offset for the AoA.

According to another aspect of the present disclosure, the angle offset may be determined based on an index that minimizes a cost function of the second matrix.

According to another aspect of the present disclosure, the cost function may be a function for calculating the sum of absolute values of elements of the second matrix.

According to another aspect of the present disclosure, the angle offset may be determined within a predetermined range, and information about the predetermined range may be received from the BS by higher-layer signaling.

According to another aspect of the present disclosure, the angle offset may be determined by searching all elements of the predetermined range.

According to another aspect of the present disclosure, information about the angle offset for the DoA and the angle offset for the AoA included in the angle offset may be transmitted to the BS.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Mode for Disclosure

Various embodiments have been described in the best mode for carrying out the disclosure.

The above description is to be considered in all respects as illustrative and not restrictive. The scope of the disclosure should be determined by reasonable interpretation of the appended claims and all changes which come within the equivalent scope of the disclosure are included in the scope of the disclosure.

INDUSTRIAL APPLICABILITY

The present disclosure is industrially applicable to various wireless communication systems such as 3GPP LTE/LTE-A, and 5G systems.

The invention claimed is:

1. A method of transmitting feedback information by a user equipment (UE), the method comprising:
measuring channels;
obtaining a second matrix by multiplying a first matrix related to the measured channels by a transform matrix; and
transmitting the obtained second matrix as a form of bits to a base station (BS),
wherein the transform matrix is determined based on an angle offset satisfying a predetermined condition, and
wherein the predetermined condition is satisfied when orthogonality of direct of arrival (DOA) and angle of arrival (AoA) of the first matrix is maintained, and the angle offset includes an angle offset for the DoA and an angle offset for the AoA.

2. The method according to claim 1, wherein the angle offset is determined based on an index minimizing a cost function for the second matrix.

3. The method according to claim 2, wherein the cost function is a function of calculating a sum of absolute values of elements of the second matrix.

4. The method according to claim 1, wherein the angle offset is determined within a predetermined range, and information about the predetermined range is received from the BS via higher-layer signaling.

5. The method according to claim 4, wherein the angle offset is determined by searching all elements of the predetermined range.

6. The method according to claim 1, wherein information about the angle offset for the DoA and the angle offset for the AoA included in the angle offset is transmitted to the BS.

7. A user equipment (UE) for transmitting feedback information, the UE comprising:
a radio frequency (RF) unit; and
a processor,
wherein the processor is configured to measure channels, obtain a second matrix by multiplying a first matrix related to the measured channels by a transform matrix, and control the RF unit to transmit the obtained second matrix as a form of bits to a base station (BS),
wherein the transform matrix is determined based on an angle offset satisfying a predetermined condition, and
wherein the predetermined condition is satisfied when orthogonality of direct of arrival (DOA) and angle of arrival (AoA) of the first matrix is maintained, and the angle offset includes an angle offset for the DoA and an angle offset for the AoA.

8. The UE according to claim 7, wherein the angle offset is determined based on an index minimizing a cost function for the second matrix.

9. The UE according to claim 8, wherein the cost function is a function of calculating a sum of absolute values of elements of the second matrix.

10. The UE according to claim 7, wherein the angle offset is determined within a predetermined range, and the processor is configured to control the RF unit to receive information about the predetermined range from the BS via higher-layer signaling.

11. The UE according to claim 10, wherein the processor is configured to determine the angle offset by searching all elements of the predetermined range.

12. The UE according to claim 7, wherein the processor is configured to control the RF unit to transmit information about the angle offset for the DoA and the angle offset for the AoA included in the angle offset to the BS.

* * * * *